US010539235B2

(12) United States Patent
Rodrigues et al.

(10) Patent No.: US 10,539,235 B2
(45) Date of Patent: Jan. 21, 2020

(54) INTERNAL ELECTRONIC PARK ACTUATOR

(71) Applicant: Continental Automotive Systems, Inc., Auburn Hills, MI (US)

(72) Inventors: Keith Rodrigues, Palatine, IL (US); Mitul Patel, Schaumburg, IL (US)

(73) Assignee: Vitesco Technologies USA, LLC, Auburn Hills, MI (US)

( * ) Notice: Subject to any disclaimer, the term of this patent is extended or adjusted under 35 U.S.C. 154(b) by 0 days.

(21) Appl. No.: 16/237,874

(22) Filed: Jan. 2, 2019

(65) Prior Publication Data

US 2019/0136975 A1 May 9, 2019

Related U.S. Application Data

(62) Division of application No. 15/495,598, filed on Apr. 24, 2017, now Pat. No. 10,208,858.

(60) Provisional application No. 62/327,139, filed on Apr. 25, 2016.

(51) Int. Cl.
*F16H 63/34* (2006.01)
*B60T 1/00* (2006.01)
*B60T 1/06* (2006.01)
*F16H 37/12* (2006.01)

(52) U.S. Cl.
CPC .......... *F16H 63/3466* (2013.01); *B60T 1/005* (2013.01); *B60T 1/062* (2013.01); *F16H 37/12* (2013.01); *F16H 63/3425* (2013.01); *F16H 63/3458* (2013.01); *F16H 63/3491* (2013.01)

(58) Field of Classification Search
None
See application file for complete search history.

(56) References Cited

U.S. PATENT DOCUMENTS

| 5,704,457 | A | 1/1998 | Kimura |
| 5,827,149 | A | 10/1998 | Sponable |
| 6,688,448 | B2 | 2/2004 | Giefer |
| 6,918,314 | B2 | 7/2005 | Wang |
| 7,014,017 | B2 | 3/2006 | Hanna et al. |

(Continued)

FOREIGN PATENT DOCUMENTS

| EP | 2824354 A1 | 1/2015 |
| WO | 200221022 | 3/2002 |

OTHER PUBLICATIONS

International Search Report and the Written Opinion of the International Searching Authority for corresponding application No. PCT/US2017/029305 dated Sep. 20, 2017.

*Primary Examiner* — Timothy Hannon

(57) ABSTRACT

A parking pawl module includes a first actuator, a gearbox including at least one gear carrier where the at least one gear carrier supports a hub configured to rotate when the first actuator rotates, and a disconnect module. The disconnect module includes: an output coupler having a first surface and a second surface; an actuation feature disposed on the first surface; and a torsion spring having a first end connected to the output coupler and a second end connected to the hub or the at least one gear carrier. The disconnect module also includes an actuation mechanism disposed on the second surface of the output coupler. The actuation mechanism is configured to mesh with the hub. The first actuator controls movement of the at least one hub, the actuation feature, and the actuation mechanism.

8 Claims, 9 Drawing Sheets

(56) References Cited

U.S. PATENT DOCUMENTS

| | | | |
|---|---|---|---|
| 7,081,063 B2 | 7/2006 | Hori et al. | |
| 8,821,338 B2* | 9/2014 | Thorson | F16D 3/50 |
| | | | 475/331 |
| 2004/0178028 A1* | 9/2004 | Farmer | B60T 13/741 |
| | | | 188/162 |
| 2007/0062769 A1* | 3/2007 | Noh | B60T 13/588 |
| | | | 188/265 |
| 2008/0217123 A1 | 9/2008 | Fujita | |
| 2008/0293534 A1* | 11/2008 | Dettenberger | B60T 13/746 |
| | | | 475/154 |
| 2009/0000411 A1* | 1/2009 | Nakayama | F16H 63/3466 |
| | | | 74/335 |
| 2009/0120222 A1 | 5/2009 | Kimura | |
| 2010/0294066 A1* | 11/2010 | Itazu | F16H 59/08 |
| | | | 74/473.12 |
| 2011/0126657 A1 | 6/2011 | Ganter et al. | |
| 2012/0138419 A1 | 6/2012 | Kim | |
| 2013/0087417 A1* | 4/2013 | Yu | B60T 13/741 |
| | | | 188/72.3 |
| 2013/0161149 A1 | 6/2013 | Hazama | |
| 2014/0090933 A1* | 4/2014 | Sakashita | F16D 55/226 |
| | | | 188/72.4 |
| 2014/0257643 A1 | 9/2014 | Dufford et al. | |
| 2014/0338484 A1 | 11/2014 | Maki et al. | |
| 2015/0027846 A1 | 1/2015 | Marklen | |
| 2015/0210253 A1* | 7/2015 | Qi | B60T 13/741 |
| | | | 188/162 |
| 2015/0252897 A1 | 9/2015 | Kristofcsak | |
| 2015/0292619 A1* | 10/2015 | Yu | B60T 13/746 |
| | | | 475/149 |
| 2016/0109022 A1* | 4/2016 | Uryu | F16H 61/32 |
| | | | 475/5 |
| 2017/0082159 A1* | 3/2017 | Son | F16D 55/226 |
| 2017/0129465 A1 | 5/2017 | Ozawa | |
| 2017/0175888 A1* | 6/2017 | Jeon | F16H 19/02 |
| 2018/0172155 A1* | 6/2018 | Spratte | B60T 1/005 |
| 2018/0202517 A1* | 7/2018 | Jang | F16H 1/28 |

* cited by examiner

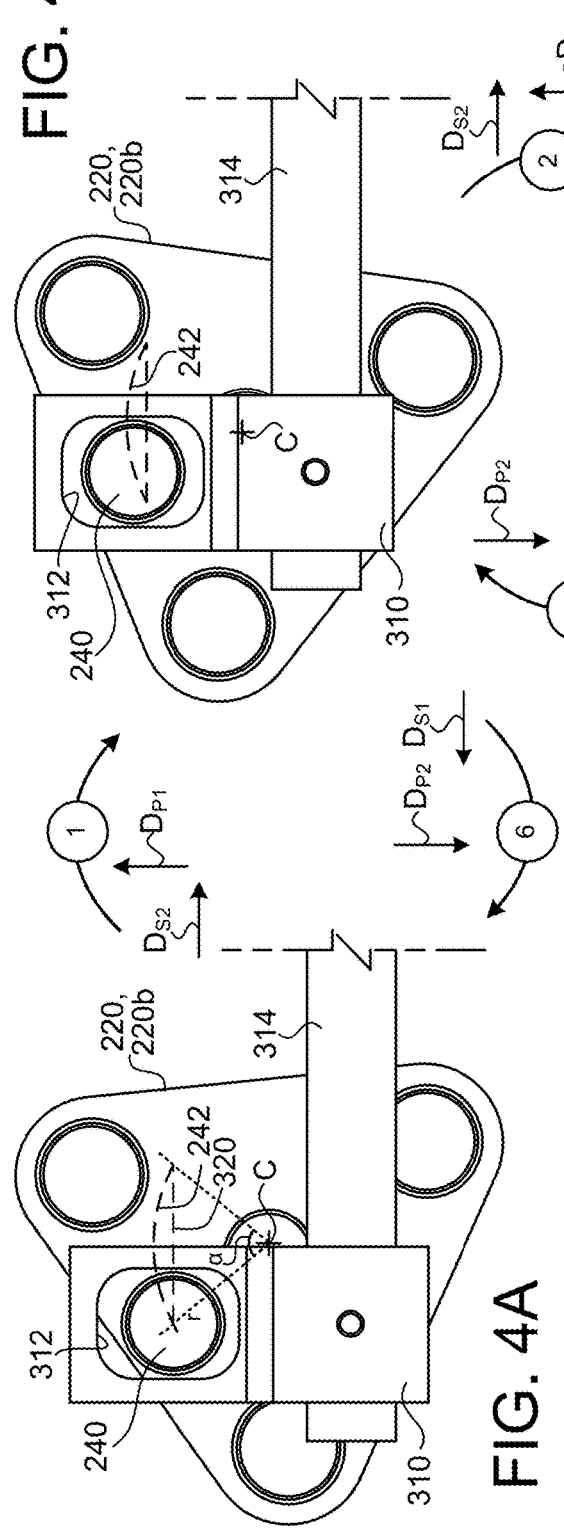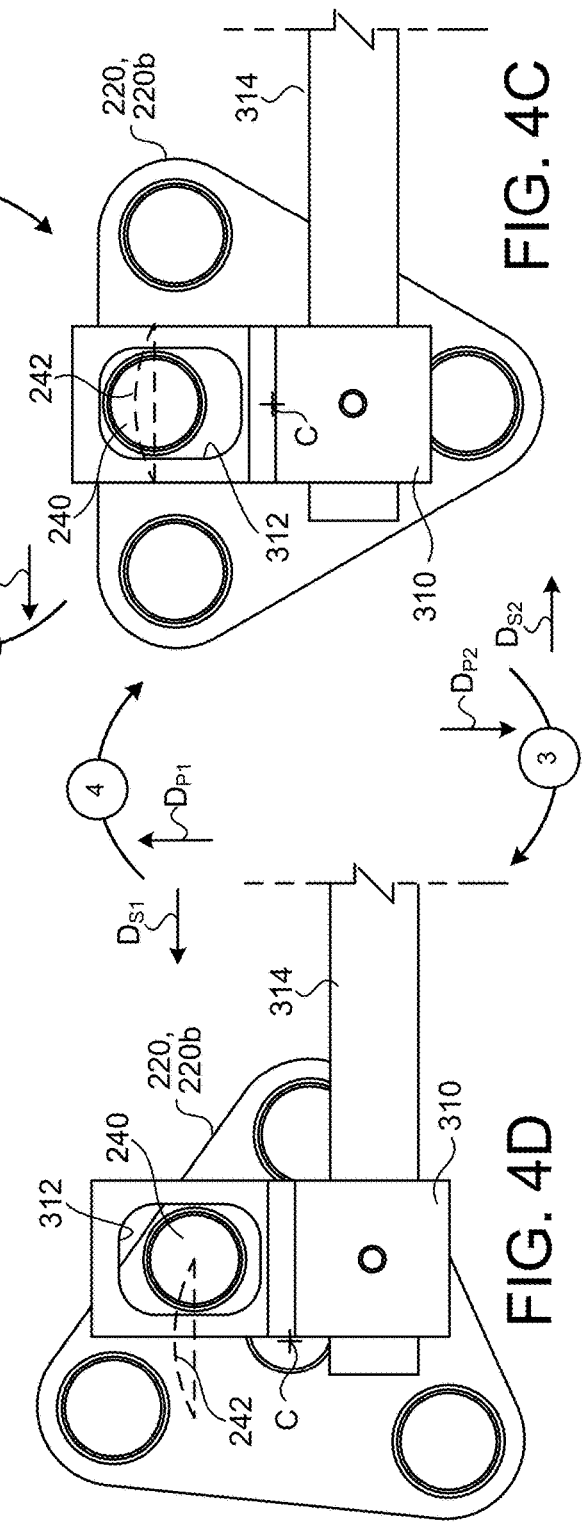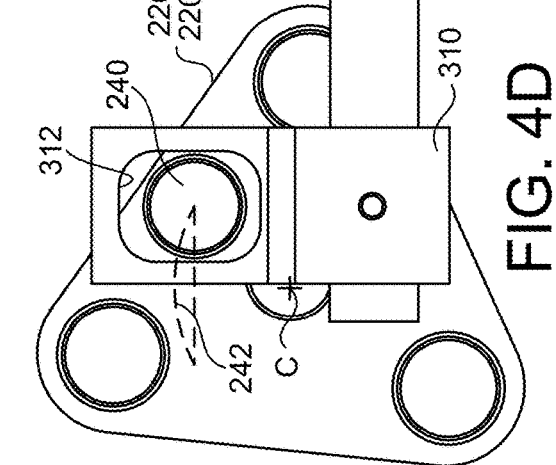

INTERNAL ELECTRONIC PARK ACTUATOR

CROSS REFERENCE TO RELATED APPLICATIONS

This application is a divisional of U.S. Non-Provisional application Ser. No. 15/495,598, filed Apr. 24, 2017, which claims priority under 35 U.S.C. § 119(e) to U.S. Provisional Application 62/327,139, filed Apr. 25, 2016, which is hereby incorporated by reference in its entirety.

TECHNICAL FIELD

This disclosure relates to an internal electronic park actuator.

BACKGROUND

A vehicle transmission is one of the most important parts of a vehicle because the transmission allows power from the engine to reach the wheels of the vehicle, allowing the wheels to rotate and move the vehicle. Transmissions, such as automatic transmissions, have several modes of operation, such as Park, Reverse, Neutral, Drive, as we well as manual shift features. A parking pawl is a device that is fitted to a vehicle's automatic transmission and configured to engage the transmission. The parking pawl engages the transmission when the driver places the transmission shift lever in the Park position, i.e., when a driver of the vehicle wants to park the vehicle and thus shifts the transmission shift lever to the Park position. The park position is usually the first position in all cars sold in the united due to a standard by the Society of Automotive Engineers (SAE) back in 1965.

The park position configuration of the transmission is typically achieved by preventing the movement of various components in the transmission. Most actuators control the parking mode by means of a cable or mechanical linkage attaching the gear shifter to the park pawl within the transmission. When the driver places the transmission shift lever into Park position, the mechanical linkage actuates the Park Pawl and engages with external teeth on the transmission, thus locking all rotating components. In other known electronically actuated transmission systems, mechanical linkages are replaced by a power actuated shift module located on or within the transmission. However, such prior art systems have low efficiency mechanical linkages or involve gear reductions and worm gearing which takes more space outside the module. Accordingly, there exists a need for a parking pawl module which takes up less space and is more efficient.

SUMMARY

One aspect of the disclosure provides a parking pawl module that includes a first actuator. The parking pawl module also includes a gearbox including at least one gear carrier, the at least one gear carrier supporting a hub configured to rotate when the first actuator rotates. The parking pawl module also includes a disconnect module. The disconnect module includes: an output coupler having a first surface and a second surface; an actuation feature disposed on the first surface of the output coupler; a torsion spring having a first end connected to the output coupler and a second end connected to the hub or the at least one gear carrier. The disconnect module also includes an actuation mechanism disposed on the second surface of the output coupler and extending away from the output coupler. The actuation mechanism is configured to mesh with the hub of the gearbox. The first actuator controls movement of the at least one hub, the actuation feature, and the actuation mechanism.

Implementations of the disclosure may include one or more of the following optional features. In some implementations, the parking pawl module further includes: a toggle lever defining a lever aperture configured to receive the actuation feature and allow movement of the actuation feature within the lever aperture; and a shaft attached to the toggle lever. Movement of the actuation feature causes movement of the shaft. In some examples, movement of the actuation feature in an arcuate motion along an arcuate path causes a linear motion of the shaft about a chordal path of an arc defining the arcuate motion.

In some implementations, the output coupler includes at least one flange extending away from a center of the output coupler. The at least one flange includes first and second edges, where the first and second edges define at least one valley therebetween. In some examples, the parking pawl module further includes a cam coupler. The cam coupler may include: a belt mount step having a first belt mount step side and a second belt mount step side; a first step extending away from the first belt mount step side and having a diameter that is less than a diameter of the belt mount step; and a second step extending away from the second belt mount step side. The second step includes a step surface on a distal end of the second step not connected to the belt mount step. The cam coupler may also include at least one cam that extends away from the step surface. The at least one cam is configured to mesh with the at least one valley defined by the first and second edges.

In some implementations, the parking pawl module further includes an auxiliary motor that is connected to the cam coupler by way of a belt. The auxiliary motor is configured to rotate the cam coupler with respect to the output coupler. Rotation of the cam coupler causes one of the first and/or second edge of the output coupler to climb over the at least one cam of the cam coupler, which causes the output coupler to shift axially away from the cam coupler. In some examples, when the output coupler shifts axially away from the cam coupler, the torsion spring causes the output coupler to rotate in a direction that triggers a park configuration of a vehicle.

Another aspect of the disclosure provides a parking pawl module that includes: a first sun gear; a first actuator configured to actuate the first sun gear; and a gearbox. The gearbox includes: a gearbox housing; and at least one gear carrier housed by the gearbox housing. The at least one gear carrier having a first carrier side and a second carrier side. The gearbox also includes: at least one plurality of planetary gears supported on the first carrier side of the at least one gear carrier, the at least one plurality of planetary gears is in mesh with the first sun gear; and an actuation feature connected to the gearbox. The parking pawl module also includes a toggle lever defining a lever aperture configured to receive the actuation feature and allow movement of the actuation feature within the lever aperture. The parking pawl module also includes a shaft attached to the toggle lever. The first actuator controls a rotational movement of the at least one gear carrier, the plurality of planetary gears, and the actuation feature, and a linear motion of the toggle lever and the shaft.

Implementations of the disclosure may include one or more of the following optional features. In some implementations, the parking pawl module where the actuation feature is an actuation pin. In some examples, the parking pawl module is connected to a parking pawl, where a movement of the actuation feature in a first direction triggers the parking pawl to be in a park configuration and a movement of the actuation feature in a second direction opposite the first direction triggers the parking pawl to be out of park configuration.

In some implementations, the at least one gear carrier includes: a first gear carrier having a first carrier side and a second carrier side; and a second gear carrier having a first carrier side and a second carrier side. The second gear carrier includes a second sun gear positioned on the first carrier side. In some examples, the at least one plurality of planetary gears includes a first plurality of planetary gears supported on the first carrier side of the first gear carrier. The first plurality of planetary gears is in mesh with the first sun gear. The at least one plurality of planetary gears also includes a second plurality of planetary gears supported on the first carrier side of the second gear carrier, where the second plurality of planetary gears is in mesh with the second sun gear. The actuation feature may be connected to the second carrier side of the second gear carrier. In some examples, an arcuate motion of the actuation feature causes a linear motion of the shaft about a chordal path of an arc defining the arcuate motion.

In some implementations, the parking pawl module further including a ring gear integrally formed on an inner side of the gearbox housing. The ring gear is in mesh with the at least one plurality of planetary gears.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 4A-4D are perspective views of the motion of the exemplary transmission parking pawl module of FIGS. 1-3.

Like reference symbols in the various drawings indicate like elements.

DETAILED DESCRIPTION

In some implementations, it is desirable to have a parking pawl module that is configured to easily shift in and out of park position configuration, which is compact, has a high power density, is modular, and is capable of outputting both linear and rotational motion, while saving cost. In addition, under certain conditions and in certain applications it is desirable to have a parking pawl module that can ratchet itself into park position unpowered when the driver forgets to place the transmission shift lever in the Park position before turning the vehicle off. This is a safety requirement to prevent the vehicle from rolling.

Figure 1:
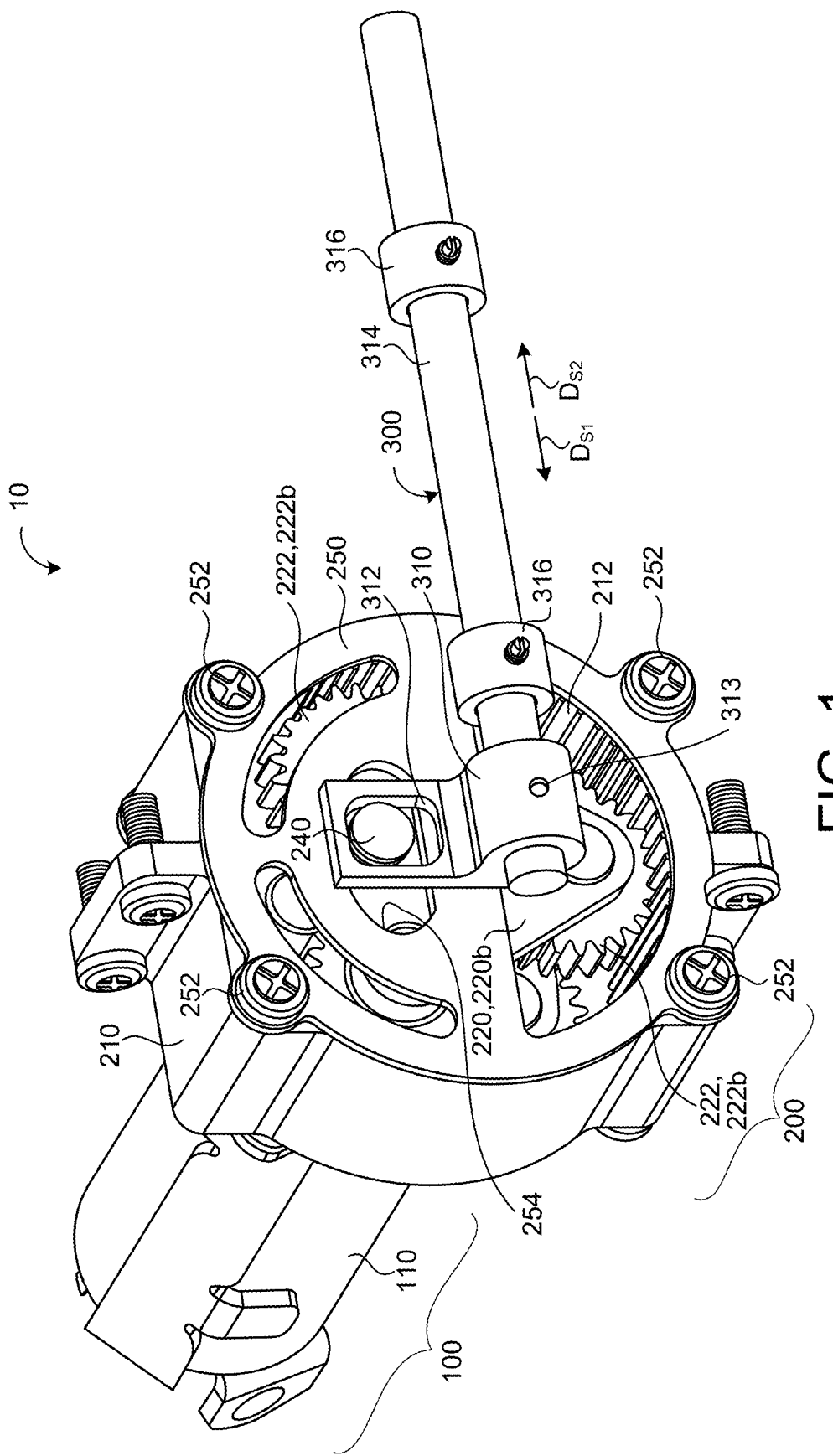
FIG. 1 is a perspective view of an exemplary transmission parking pawl module.
Figure 2:
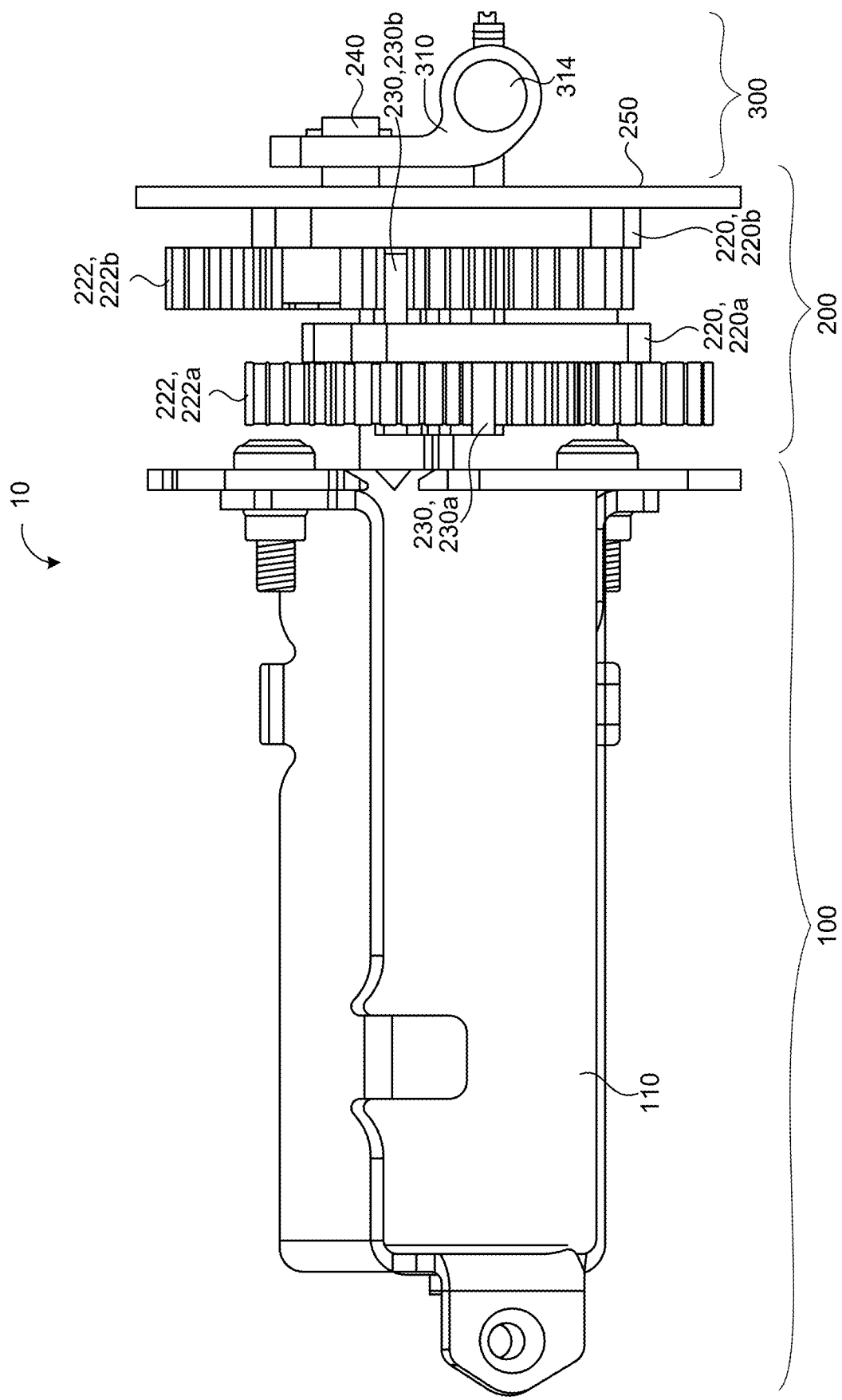
FIG. 2 is a side view of an exemplary transmission parking pawl module.
Figure 3:
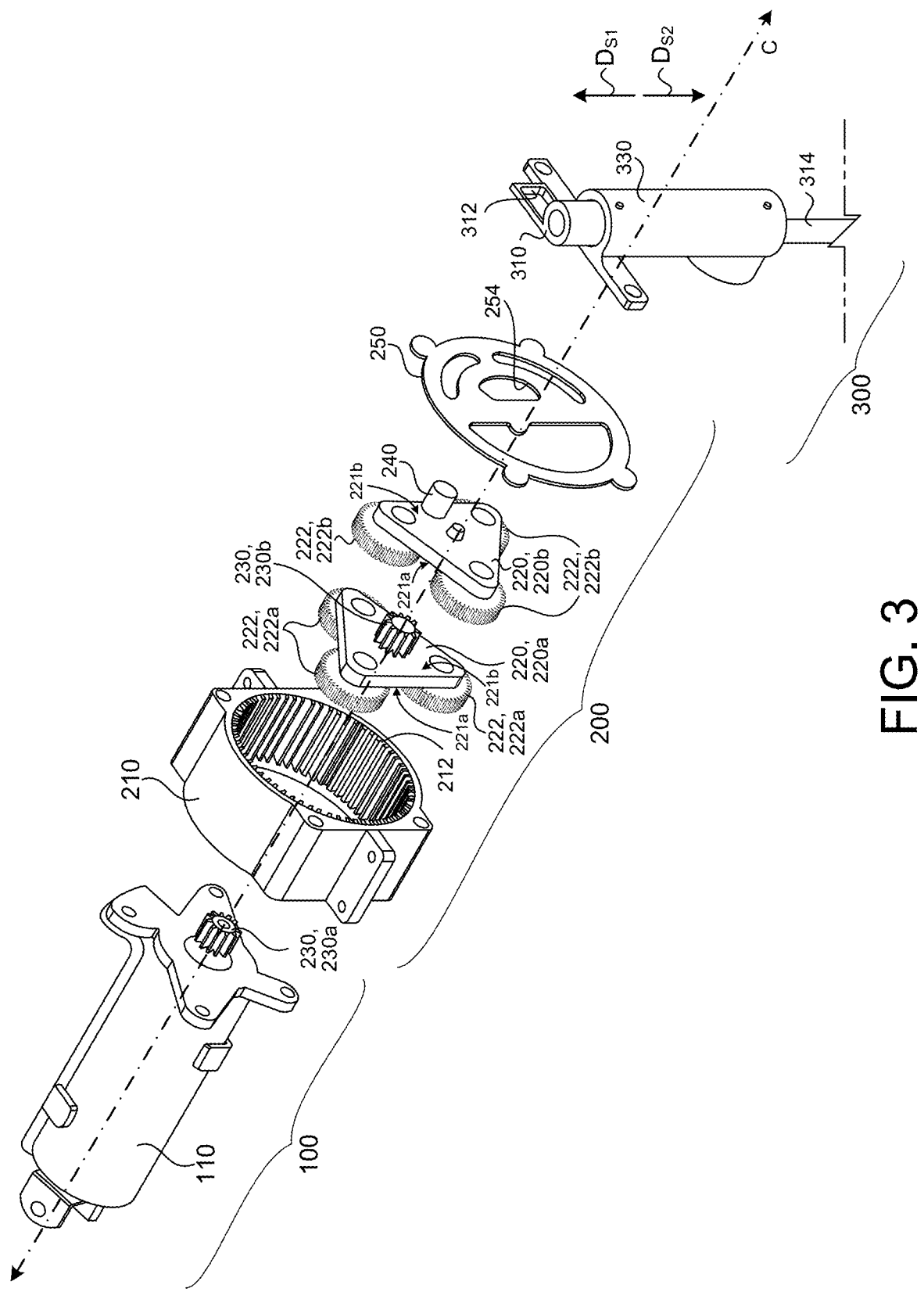
FIG. 3 is an exploded view of an exemplary transmission parking pawl module.

Referring to FIGS. 1-3, in some implementations, a parking pawl module 10 includes a first actuator 100 and a gearbox 200. The parking pawl module 10 may also include a second actuator 300. The first actuator 100 may include a motor 110, such as, but not limited to an electric motor. The motor 110 is connected to the gearbox 200. The gearbox 200 includes a gearbox housing 210. In some examples, as shown in the figures, a ring gear 212 is integrally formed on an inner side of the gearbox housing 210. The gearbox 200 may include at least one gear carrier 220. In some examples, the gearbox 200 includes a first gear carrier 220, 220a and a second gear carrier 220, 220b. The first gear carrier 220, 220a supports a first plurality of planetary gears 222, 222a on a first side 221a of the first gear carrier 220a facing the motor 110. In other words, the first plurality of planetary gears 222a are rotatably mounted on the first gear carrier 220a. As shown, the first gear carrier 220a supports three planetary gears 222a, however, the first gear carrier 220a may support additional planetary gears 222a. In examples, where the gearbox 200 includes a second gear carrier 220b, the second gear carrier 220b may support a second plurality of planetary gears 222, 222b. Other configurations of gear carriers 220 and planetary gears 222 may be possible as well.

As shown, in some examples, the motor 110 is connected to the gearbox 200 by way of a first sun gear 230, 230a. The first sun gear 230a is connected to the motor 110 and is in mesh with the first plurality of planetary gears 222a. As such, the first sun gear 230a is positioned such that it is in mesh with each one of the planetary gears 222 of the first plurality of planetary gears 222a. In addition, the first plurality of planetary gears 222a is in mesh with the ring gear 212 of the gearbox housing 210. Therefore, the motor 110 rotates the first sun gear 230a, which in turn causes the planetary gears 222 of the first plurality of planetary gears 222a to rotate, which in turn cause the first gear carrier 220a to rotate within the gearbox housing 210.

The first gear carrier 220a supports a second sun gear 230, 230b positioned on a second side 221b of the first gear carrier 220a opposite the first side 221a supporting the first plurality of planetary gears 222a. In some examples, the second sun gear 230, 230b is integral to the first gear carrier 220a. The second sun gear 230, 230b is in mesh with the second plurality of planetary gears 222b. The second gear carrier 220b includes an actuation feature, such as an actuation pin 240 that is integrally formed with the second gear carrier 220b. The actuation pin 240 extends away from a second side 221b of the second gear carrier 220b that is opposite the first side 221a facing the first gear carrier 220a. As previously mentioned, other gearbox 200 configurations may be possible as well.

In some implementations, the gearbox 200 includes an end plate 250. The end plate 250 is releasably connected to the gearbox housing 210 by way of one or more connection mechanism, such as, but not limited to screws 252. The end plate 250 defines an aperture 254 that is configured to receive the actuation pin 240 when the parking pawl module 10 is assembled. As such, when the parking pawl module 10 is assembled, the actuation pin 240 extends through the aperture 254. The aperture 254 is sized to allow for movement of the actuation pin 240 within the aperture 254, such that the actuation pin 240 follows an arcuate path 242 as desired for the actuation pin travel (as shown in FIGS. 4A-4D). The aperture 254 may be designed to allow for different travel lengths of the actuation pin 240 as limited by either the motor capacity or the travel allowance needed.

The second actuator 300 includes a toggle lever 310. The toggle lever 310 defines a lever aperture 312 configured to receive the actuation pin 240 when the parking pawl module 10 is assembled. The toggle lever aperture 312 is sized to allow the toggle lever 310 to move relative to the actuator pin 240 along the arcuate path 242 (as shown in FIGS. 4A-4D). This mechanism allows the toggle lever 310 to follow a chordal path 320 of the arcuate path 242 drawn by the actuation pin 240.

In some implementations, the toggle lever 310 is attached to an actuation shaft 314. The toggle lever 310 may define a hole 313 configured to receive a pin (not shown) to hold to the shaft 314 as shown in FIG. 1. In other examples, the shaft 314 and the toggle lever 310 are integral. The shaft 314 may include a plurality of notches/grooves (not shown) that may be used to maintain the shaft 314 in a desired position. In some examples, a solenoid is used to hold the shaft 314 position in engaged or disengaged condition through a solenoid plunger which sits itself within this notch/groove. Depending upon the actuation strategy, the solenoid pulls the plunger out of the notch/groove and an armed spring (not shown) ratchets the shaft 314 into Park or default position. In some examples, the second actuator 300 includes at least one bushing 316 that is configured to provide a bearing surface reacting to a shaft housing/frame 330 for the linear motion of the shaft 314.

The second actuator 300 may include a shaft housing 330 as shown in FIG. 3. The shaft housing 330 may support the at least one bushing 316. The shaft 314 slides within and moves relative to the shaft housing 330 such that the shaft 314 is able to move in a first shaft direction $D_{S1}$ and a second shaft direction $D_{S2}$. As such, the shaft 314 moves between a first position as shown in FIG. 4A and a second position as shown in FIG. 4D. The second position (FIG. 4D) is configured to prevent components in the transmission from moving, and therefore, placing the vehicle associated with the transmission in a parked configuration. In some implementations, a return spring (not shown) sits concentric to the shaft 314 reacting to the shaft housing 330 and allowing the shaft to ratchet into default or Park position when armed and in combination with a solenoid (not shown).

In some examples, the end of the shaft 314 that is not attached to the toggle lever 310, is attached to the park pawl in the transmission case that shifts between two positions. The shaft 314 may first be attached to a rooster comb, which is in turn attached to the park pawl through the apparatus/linkage defined in the vehicle. The non-zero forces induced by the shaft 314 react through the toggle lever 310, actuator pin 240, second gear carrier 220b and finally to the end plate 250 by means of a central bushing/bearing (not shown) fit between the second gear carrier 220b and end plate 250. This force is then transmitted to the gearbox housing 210. This way, the non-zero forces do not cause a mis-alignment of the planetary gear meshes of the gearbox 200 causing it to stick or jam.

FIGS. 4A-4D illustrate the conversion of the rotary motion of the actuation pin 240 to a linear motion of the shaft 314. The figures provide a front view of the second gear carrier 220b including the actuation pin 240, and the toggle lever 310 defining the lever aperture 312 and connected to the shaft 314. Referring to FIG. 4A, the toggle lever 310 and the shaft 314 are in a first position being a position where the toggle lever 310 and the shaft 314 move in the first shaft direction $D_{S1}$ until they can no longer move in that first shaft direction $D_{S1}$. When the actuation pin 240 moves in the second shaft direction $D_{S2}$ that is opposite the first shaft direction $D_{S1}$ in step 1, then the second gear carrier 220b rotates clockwise about a center of rotation C with the movement of the actuation pin 240 causing the toggle lever 310 and the shaft 314 to move in the second shaft direction $D_{S2}$ along the chordal path 320 of the arcuate path 242 that the actuation pin 240 is moving about. Therefore, at step 1, the actuation pin 240 moves in the first pin direction $D_{P1}$ with respect to the lever aperture 312 and along the arcuate path 242, while the shaft 314 moves along the second shaft direction $D_{S2}$. At step 2, the actuation pin 240 continues to moves in the first pin direction $D_{P1}$ with respect to the lever aperture 312 and along the arcuate path 242, while the shaft 314 also continues to move along the second shaft direction $D_{S2}$. FIG. 4C shows a position of the actuation pin 240 being at a top of the arcuate path 242, and the shaft 314 being halfway its chordal path 320. At step 3, the actuation pin 240 moves in the second pin direction $D_{P2}$ with respect to the lever aperture 312 and along the arcuate path 242, while the shaft 314 continues its movement along the second shaft direction $D_{S2}$, this ends the movement of the shaft 314 in the second shaft direction $D_{S2}$ at FIG. 4D and the travel is controlled by the design of the aperture 254 on end plate 250. When this position is reached, the parking pawl module 10 puts the vehicle in the park position. To go back to its initial position, the reverse occurs following the same arcuate path 242. Therefore, through steps 4 to 6, the actuation pin 240 causes the lever 310 and shaft 314 to travel in a linear path 320 to the initial position resulting in the vehicle to return to out-of-park position. In other words, the actuation pin 240 moves in the first pin direction $D_{P1}$ with respect to the lever aperture 312 and along the arcuate path 242, while the shaft 314 move along the first shaft direction $D_{S1}$ resulting in the position shown in FIG. 4C. At step 5, the actuation pin 240 moves in the second pin direction $D_{P2}$ with respect to the lever aperture 312 and along the arcuate path 242, while the shaft 314 continues its movement along the first shaft direction $D_{S1}$ resulting in the position shown in FIG. 4B. Finally, at step 6 the actuation pin 240 moves in the first pin direction $D_{P1}$ with respect to the lever aperture 312 and along the arcuate path 242, while the shaft 314 continues its movement along the first shaft direction $D_{S1}$ resulting in the position shown in FIG. 4A, which completes a full cycle of the movement of the actuation pin 240 and thus the shaft 314. As shown, the rotation angle α of arc path 242 which the actuation pin 240 moves along is configured to provide a specific linear motion of the shaft 314. In some examples, the rotation angle α allows for the shaft 314 to linearly move in the $D_{S1}$ and $D_{S2}$ directions. Therefore, the rotation angle α may be adjusted to provide another range of linear motion in the $D_{S1}$ and $D_{S2}$ directions as needed by the actuator. However, it should be kept in mind that the designer is limited by the arcuate length physically available for use, as the useful force in the extreme positions is only a component of the rotary torque supplied by the motor-gearbox combination. A combination of rotation angle α and the distance "r" from center C to the arc, i.e., the arc radius, may be adjusted to make a design work for the given space and motor capacity available.

Figure 7A:
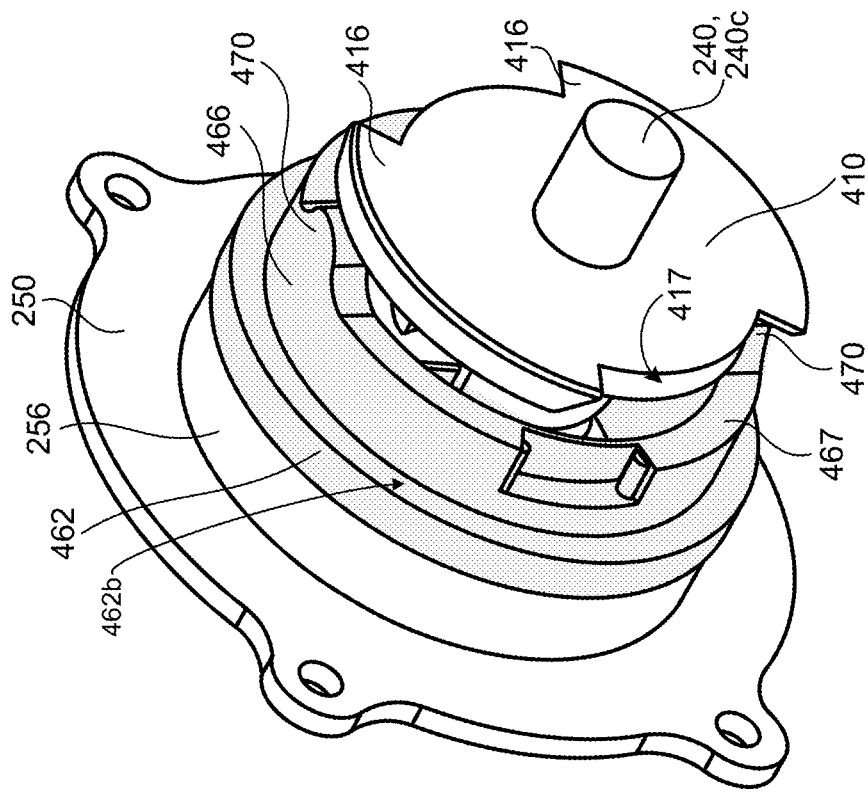
FIG. 7A is perspective view of the exemplary disconnect module of in an engaged position.
Figure 7B:
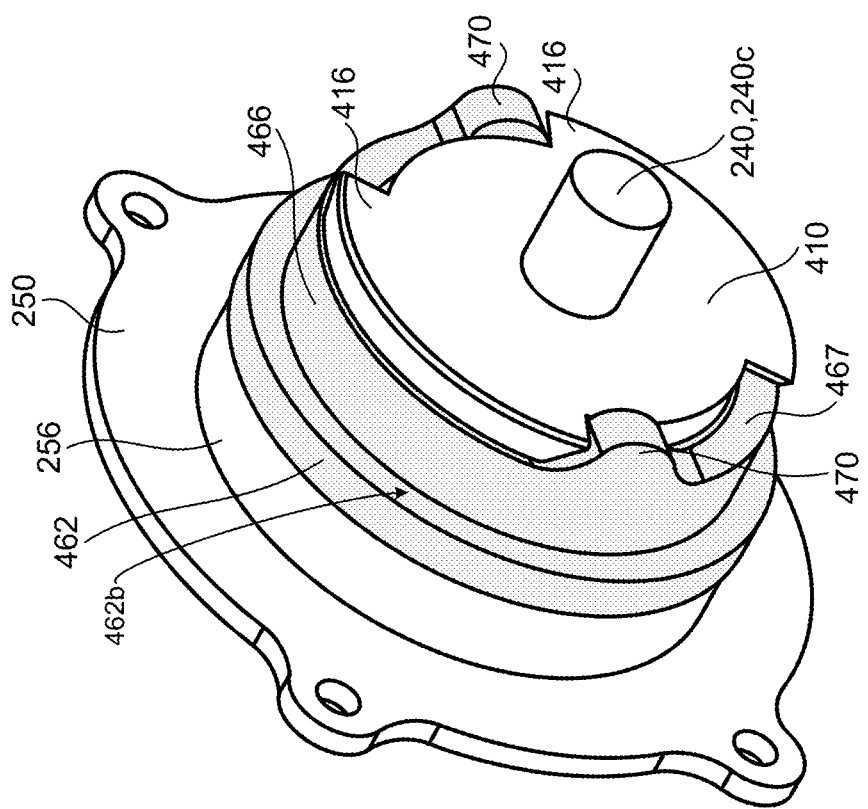
FIG. 7B is perspective view of the exemplary disconnect module of in a disengaged position.

As shown, the shaft 314 forms a substantially perpendicular angle with the actuation pin 240, which allows for the conversion of the rotational motion to the linear motion described with respect to FIGS. 4A-4D. However, in some examples, the toggle lever 310 is configured to position the shaft 314 substantially parallel to the actuation pin 240, thus providing a different motion of the shaft 314. In some examples, the shaft 314 is replaced with a direct output to provide for an arcuate motion. In yet other examples, the actuation pin 240 may be positioned in the center C of the second gear carrier 220b. In this case, the shaft 314 may extend from the actuation pin 240 and thus provide a rotational motion (FIGS. 7A and 7B). As such, the parking pawl module 10 may be adjusted to provide linear motion, arcuate motion, or rotational motion based on the specific actuator requirement of the vehicle.

Figure 5:
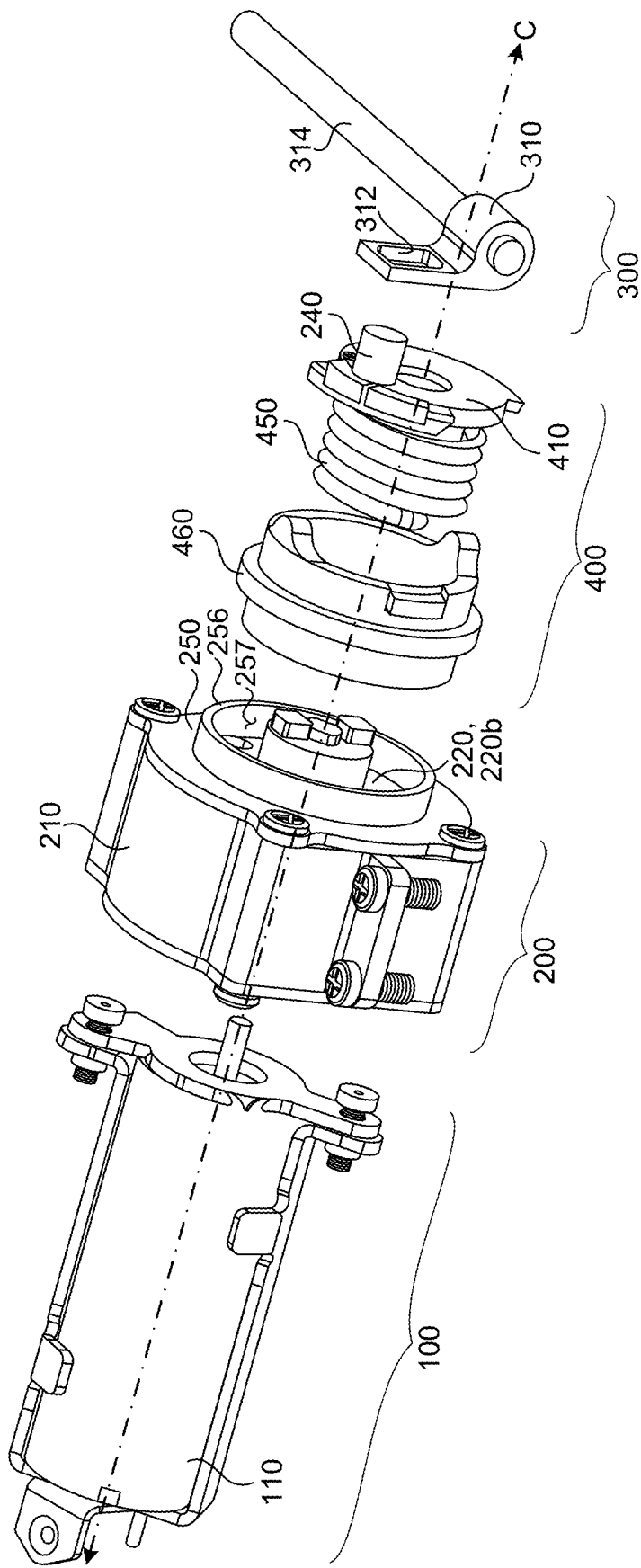
FIG. 5 is an exploded view of an exemplary transmission parking pawl module including a disconnect module.
Figure 6A:
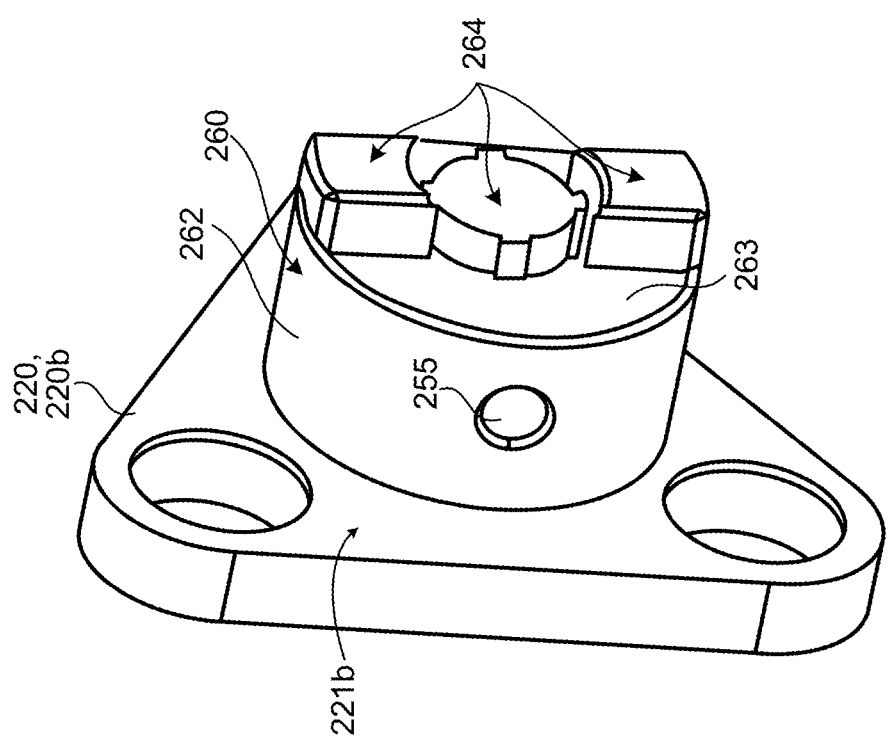
FIG. 6A is an exploded view of an exemplary second gear carrier used with the disconnect module shown in FIG. 5.

In some conditions, to allow for towing a vehicle without power, it might be required to shift the park actuator to out-of-park or default position. With this in mind, to reduce the rotary mass moment of inertia, a disconnect mechanism (e.g., a disconnect module 400) may be added to the aforementioned design. This would allow for faster reaction time to travel between positions and also remove the requirement to consider motor cogging torque when designing for a ratchet mechanism to revert to default position unpowered. Referring to FIGS. 5-7, in some implementations, the parking pawl module 10 includes a disconnect module 400 positioned between the gearbox 200 and the second actuator 300. As will be described, the disconnect module 400 is used with the gearbox 200 described above. However, the disconnect module 400 may be used with any other gearbox 200 such that the gearbox 200 includes the features described below. In this example, the gearbox 200 includes a gearbox housing 210 similar to the one described above. However, referring to FIG. 6A, the second gear carrier 220b includes an actuation feature such as a hub 260. The hub 260 can be a single piece with the second gear carrier 220b or mounted by means of pinned joint or spline feature to facilitate assembly. The hub 260 is axially concentric to the second gear carrier 220b and includes two tongue features 264 extending away from a surface 263 of the hub 260. The tongue features 264 are similar in function to one half of an Oldham coupling; however, other couplers may be used as well.

Figure 6B:
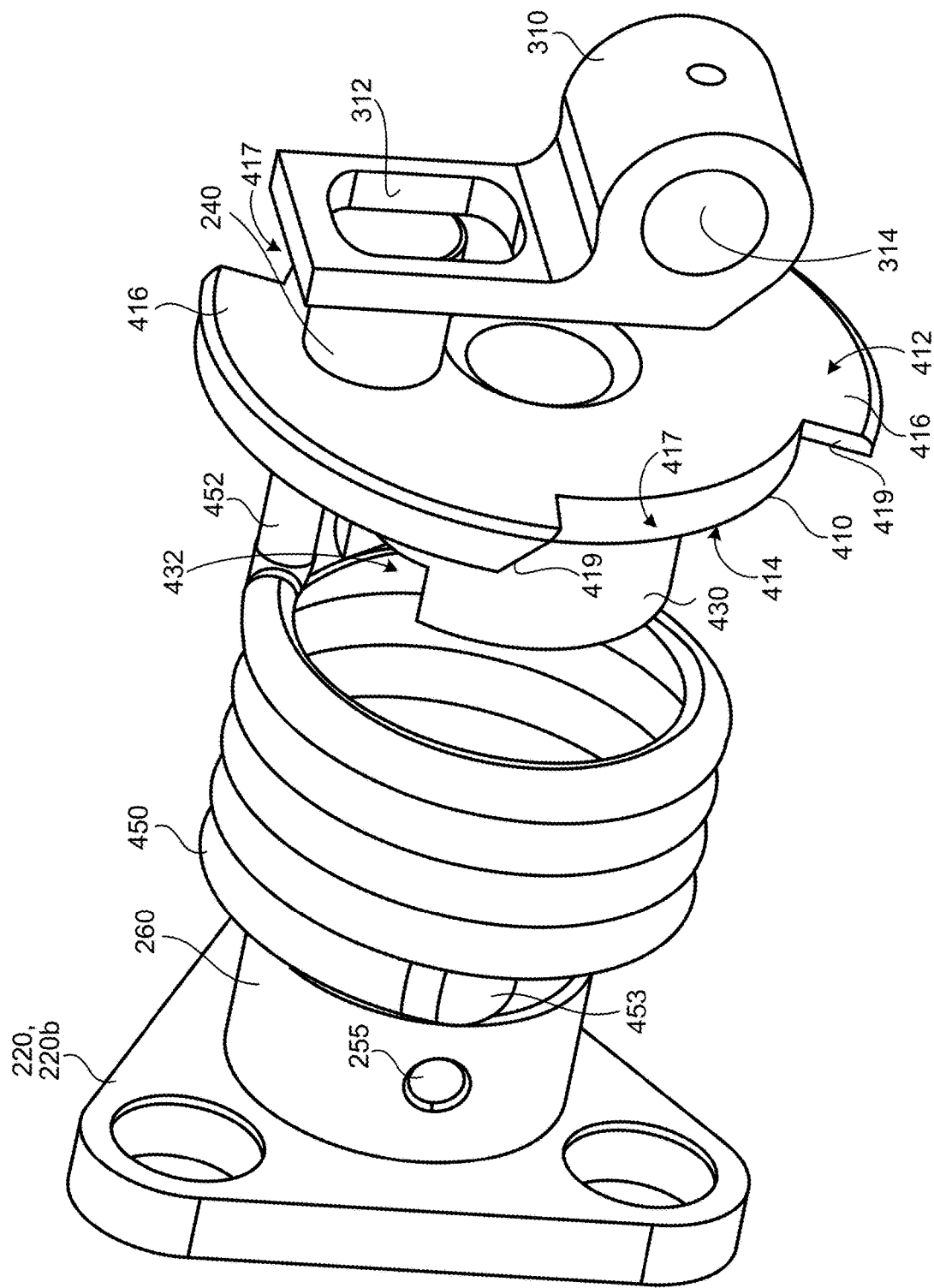
FIG. 6B is an exploded view of an exemplary disconnect module including a torsion spring.
Figure 6C:
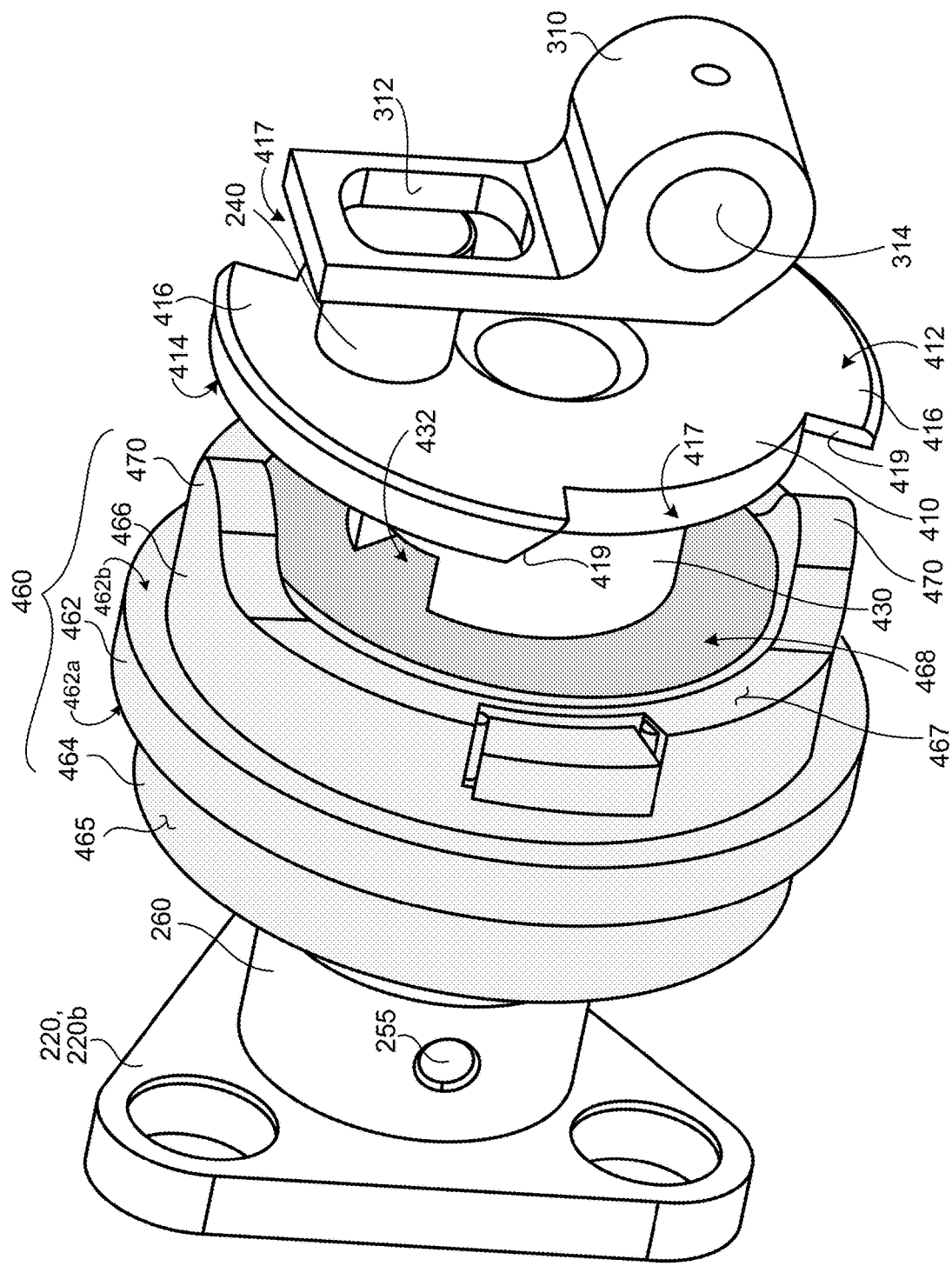
FIG. 6C is an exploded view of an exemplary disconnect module including a cam coupler.

As shown in FIG. 5, the end plate 250 includes an end plate bearing seat 256 configured to receive the disconnect module 400 (i.e., a first bearing step 464 of the cam coupler 460 as will be shown and described in FIG. 6C). The mating surfaces between the cam coupler 460 and the end plate 250 at surfaces 465 and 257 serve to form a sliding bearing/bushing to allow the cam coupler 460 to rotate within the end plate 250. The cam coupler 460 is concentric to the gearbox 200 but is not mechanically attached to it. In addition, the end plate 250 also serves as a thrust bearing surface to prevent the cam coupler 460 from sliding backwards towards the gearbox 200.

The disconnect module 400 includes an output coupler 410 having a first surface 412 and a second surface 414 opposite the first surface 412. The output coupler 410 may include one or more flanges 416 extending away from the center C. In some examples, the output coupler 410 includes at least one flange 416. As shown, the output coupler 410 includes two flanges 416 positioned symmetrically about a plane (not shown) extending from the first surface 412 to the second surface 414 and through the center of the output coupler 410. Other flange 416 configurations may be possible as well. Each flange 416 includes edges 419 that have a substantially chamfered shape. The edges 419 and the output coupler 410 define valleys 417 extending between the edges 419.

In some implementations, the parking pawl module 10 provides a rotary output, i.e., the actuation pin 240 is positioned at the center C of the parking pawl module 10 and shown as 240c in FIGS. 7A and 7B. In this case, the output coupler 410 may be splined to the output shaft 314 through a male spline (not shown) instead of having the actuation pin 240.

In some examples, where the parking pawl module 10 provides a linear output, the output coupler 410 includes an actuation feature such as an actuation pin 240 extending away from the first surface 412 and positioned off-centered as shown in FIGS. 5, 6B, and 6C. In this case, the actuation pin 240 of the output coupler 410 is configured to be similar to the actuation pin 240 of the second gear carrier 220b shown in FIGS. 1-4D. As such, the actuation pin 240 of the output coupler 410 is configured to fit within the lever aperture 312 defined by the toggle lever 310 and move within the lever aperture 312 as described in FIGS. 4A-4D.

The output coupler 410 includes an actuation mechanism 430 extending away from the second surface 414 of the output coupler 410. The output coupler actuation mechanism 430 defines a groove 432 or a plurality of grooves 432 equispaced around the output coupler 410 center axis C on a side of the output coupler actuation mechanism 430 that is distal from the side connected to the output coupler 410. The groove 432 has a shape complementary to the shape of the tongue features 264 on the hub 260 and configured to receive the tongue features 264 in a locked position. In some examples, the tongue features 264 and the groove 432 form the opposing mating parts of an Oldham coupling; however, other couplings may be used as well, such that the hub 260 is coupled to the output coupler actuation mechanism 430 when mated. The plurality of tongue features 264 equals in quantity to the plurality of groove features 432 to mate satisfactorily.

The tongue feature(s) 264 and the groove(s) 432 are coupled together, the tongue feature(s) 264 is positioned within the groove 432, as such a rotational motion of the hub 260 (and thus the second gear carrier 220b) also causes the output coupler 410 to rotate in the same direction. When the output coupler 410 is axially shifted away, the tongue features 264 and the groove 432 are not coupled, and this disengages the output coupler 410 from the hub 260. As such, the hub 260 and/or the output coupler 410 can freely move without movement of the other. The spline joint between the output coupler 410 and the output shaft as mentioned earlier facilitate the axial shifting of the output coupler 410.

To allow the ratcheting of this rotary mechanism to default or park position, the disconnect module 400 includes a torsion spring 450 connecting the hub 260 to the output coupler 410. The torsion spring 450 includes a first formed end 452 connected to the second surface 414 of the output coupler 410 and a second formed end 453 connected to the surface of the hub 260 at connection point 255 or connected to the second gear carrier 220b and adjacent to the hub 260. The first end 452 of the torsion spring 450 is parallel to the spring axis and normal to the surface 414 of the output coupler 410 to allow the output coupler 410 to slide axially while still attached to the torsion spring 450. The second end 453 is radially closed to the torsion spring axis and fits into a hole on surface 262. This positively engages the torsion spring 450 onto the hub 260 preventing relative angular motion between them. As is evident in FIG. 6B, the torsion spring 450 is concentric to the axis of hub 260, output coupler 410, hub 260, gearbox 200, and first actuator 100, i.e., motor 110.

Referring to FIG. 6C, in some implementations, the cam coupler 460 houses and is concentric to the torsion spring 450. The cam coupler 460 includes a belt mount step 462, a first bearing step 464 extending away from the belt mount step 462, and a second step 466. The belt mount step 462 and the first and second steps 464, 466 form a cylinder shape and define a through bore 468. In some examples, the belt mount step 462 has an outer diameter greater than the diameters of the first and/or second steps 464, 466. Within the inner diameter of the through bore 468, the torsion spring 450 sits and is not mechanically connected in any way to the cam coupler 460.

The second step 466 includes a cam 470 extending away from a step surface 467. As shown, the second step 466 includes two cams 470; however, additional cams 470 may be possible as well. To function successfully, the plurality of cams 470 and valleys 417 must be equal. When the cams 470 sit within the valleys 417, the tongue features 264 is engaged with the groove 432 and the torsion spring 450 is armed or has its maximum potential energy stored.

When the park pawl module 10 is assembled, the first bearing step 464 of the cam coupler 460 is received and housed within the bearing seat 256 as shown in FIGS. 7A and 7B. The bearing seat 256 has an inner diameter (not shown) that is greater than the inner diameter of the first bearing step 464 of the cam coupler 460. In other examples, the bearing seat 256 has an inner diameter (not shown) that is less than the inner diameter of the first bearing step 464 of the cam coupler 460. In addition, the cams 470 of the cam coupler 460 are received by the valleys 417 of the output coupler 410. In some implementations the cam coupler 460 is belt driven by an auxiliary motor (not shown) through the belt mount step 462. In other implementations, the belt mount step can be sprocketed or toothed to allow for a light chain or gear drive to the auxiliary motor. When the cam coupler 460 is rotated, the cams 470 traverse in the valleys 417 until they reach the valley ends and then climb the chamfered edge 419 to reach the top of flanges 416. As the cam coupler 460 sits against the end plate 250 and cannot move axially, the output coupler 410 is axially shifted out. This disengages the groove 432 from the tongue features 264. The moment the tongue-groove joint is separated, the armed torsion spring 450 releases which turns the output coupler 410 (thus the output shaft) into default or park position.

In some situations, a driver may fail to place the vehicle into Park configuration before turning the vehicle off. In this case, the parking pawl module 10 is triggered to force the vehicle into park position configuration, which prevents the vehicle from rolling when parked at an incline, for example. An external energy source such as a battery powers up the auxiliary motor which drives the cam coupler 460 leading through the events explained above. FIG. 7A shows a normal operation of the parking pawl module 10. Therefore, when the driver places the transmission shift lever in the park position before turning off the vehicle, the parking pawl module 10 remains in this position. However, FIG. 7B shows the parking pawl module 10 being triggered when the driver does not place the transmission shift lever in the parking position before turning off the vehicle.

When the parking pawl module 10 is triggered, the function of the torsion spring 450 is to allow ratcheting of the output coupler 410 away from the end plate 250. Therefore, the torsion spring 450 may be in an unarmed position (FIG. 7B) or an armed position (FIG. 7A). When the torsion spring 450 is in the unarmed position, the tongue features 264 and the groove 432 are not aligned or in other words misaligned as shown in FIG. 7B. When the torsion spring 450 is in the armed position, the tongue features 264 and the groove 432 are aligned and in mesh, or in other words, the grooves 432 receive the tongue features 264. Therefore, in the armed position of the torsion spring 450, the hub 260 of the second gear carrier 220b is in mesh with the output coupler actuation mechanism 430, thus the second gear carrier 220b is connected to the output coupler 410. While in the armed position (FIG. 7A), the torsion spring 450 stores energy, which is not used because of the hub 260 of the second gear carrier 220b being in mesh with the output coupler actuation mechanism 430. However, the energy stored in the torsion spring 450 while in the armed position (FIG. 7A) is used to ratchet/rotate the output coupler 410 without shifting or rotating the second gear carrier 220b which causes the parking pawl module 10 to switch to the unarmed position (FIG. 7B) when the tongue-groove joint is disengaged. The rotation of the output coupler 410 causes the output shaft to also rotate. If the actuator had a linear mechanism, the output coupler 410 would cause the actuation pin 240 to rotate which in turn causes the shaft 314 to move linearly to move thus forcing the vehicle into the park position.

During normal function, i.e., when the driver places the transmission shift lever in the park position before turning of the vehicle, the flanges 416 of the output coupler 410 move between the cams 470 of the cam coupler 460 with respect to the output coupler 410, and the output coupler 410 rotates in a clockwise or counterclockwise direction with respect to the cam coupler 460 without moving axially in the direction away from the cam coupler 460. This is because the width of the angular valleys 417 allow the cams 470 to traverse without rising over the flanges 416.

In the subsequent power up cycle following a ratchet to default or park position, (triggered after the driver turns off the vehicle without placing the transmission shift lever in the park position), the auxiliary motor (not shown) turns on, causing the cam coupler 460 to rotates such that the edge 419 of the output coupler 410 is no longer over the cam 470 of the cam coupler 460. When the cam coupler 460 rotates, flanges 416 of the output coupler 410 are positioned between the cams 470 of the cam coupler 460. In addition, when the engine is turned on and the motor 110 has power, the motor 110 rotates. The rotation of the motor 110 causes the torsion spring 450 to also rotate by way of rotation of the gear carrier(s) 220, 220a, 220b, which cause the rotation of the hub 260 of the second gear carrier 220b with respect to the stationary output coupler 410 to align with the groove 432 defined by the output coupler actuation mechanism 430. When aligned, a axial spring (not shown) causes the hub 260 of the second gear carrier 220b and the groove 432 to mesh, arming the torsion spring 450 and thus the torsion spring 450 because armed once again.

In some implementations, the parking pawl module 10 includes a sensor (not shown) for determining the position of the output coupler 410 with respect to the second gear carrier 220b. Based on the determination of the position of the output coupler 410 with respect to the second gear carrier 220b, the parking pawl module 10 determines whether the vehicle battery arms the motor 110 during/after the next power cycle after the driver turns off the vehicle without placing the transmission shift lever in the park position, to allow the torsion spring 450 to go back to the armed position. A sensor would also serve well to be placed at the cam coupler to identify its rotary/angular position to power on/off the auxiliary motor as required to position the cam coupler 460 at the right angular orientation to output coupler 410.

Although the module 10 described above is associated with a park pawl actuator, the module 10 may take multiple position outputs with suitable closed loop control such as range selectors and electronic gear shifters or park brake actuators.

A number of implementations have been described. Nevertheless, it will be understood that various modifications may be made without departing from the spirit and scope of the disclosure. Accordingly, other implementations are within the scope of the following claims.

What is claimed is:

1. A parking pawl module comprising:
a first sun gear;
a first actuator configured to actuate the first sun gear;
a gearbox comprising:
    a gearbox housing;
    at least one gear carrier housed by the gearbox housing, the at least one gear carrier having a first carrier side and a second carrier side;
    at least one plurality of planetary gears supported on the first carrier side of the at least one gear carrier, the at least one plurality of planetary gears is in mesh with the first sun gear; and
    an actuation feature connected to the gearbox;
a toggle lever defining a lever aperture configured to receive the actuation feature and allow movement of the actuation feature within the lever aperture; and
a shaft attached to the toggle lever;
wherein the first actuator controls a rotational movement of the at least one gear carrier, the plurality of planetary gears, and the actuation feature along an arcuate path, and a linear motion of the toggle lever and the shaft along a chordal path defined by the arcuate path.

2. The parking pawl module of claim 1, wherein the actuation feature is an actuation pin.

3. The parking pawl module of claim 1, wherein the parking pawl module is connected to a parking pawl, wherein a movement of the actuation feature in a first direction triggers the parking pawl to be in a park configuration and a movement of the actuation feature in a second direction opposite the first direction triggers the parking pawl to be out of park configuration.

4. The parking pawl module of claim 1, wherein the at least one gear carrier comprises:
a first gear carrier having a first carrier side and a second carrier side; and
a second gear carrier having a first carrier side and a second carrier side,
wherein the first gear carrier comprises a second sun gear positioned on the second carrier side of the first gear carrier.

5. The parking pawl module of claim 4, wherein the at least one plurality of planetary gears comprises:
a first plurality of planetary gears supported on the first carrier side of the first gear carrier, the first plurality of planetary gears is in mesh with the first sun gear; and
a second plurality of planetary gears supported on the first carrier side of the second gear carrier, the second plurality of planetary gears is in mesh with the second sun gear.

6. The parking pawl module of claim 5, wherein the actuation feature is connected to the second carrier side of the second gear carrier.

7. The parking pawl module of claim 6, wherein an arcuate motion of the actuation feature causes a linear motion of the shaft about a chordal path of an arc defining the arcuate motion.

8. The parking pawl module of claim 1, further comprising a ring gear integrally formed on an inner side of the gearbox housing, the ring gear is in mesh with the at least one plurality of planetary gears.

\* \* \* \* \*